United States Patent [19]

Smith et al.

[11] Patent Number: 5,041,721

[45] Date of Patent: Aug. 20, 1991

[54] MACHINE FOR COUNTING IC PARTS IN A SHIPPING RAIL

[75] Inventors: Clarence A. Smith, Kennebunk; Roger H. Doherty, Portland; Raymond A. Roberts, Saco, all of Me.

[73] Assignee: National Semiconductor Corporation, Santa Clara, Calif.

[21] Appl. No.: 497,864

[22] Filed: Mar. 22, 1990

[51] Int. Cl.[5] ........................ G06M 7/00; G06M 9/00; G06M 11/00; G06K 7/10

[52] U.S. Cl. ........................................ 235/462; 377/6; 377/8

[58] Field of Search ............... 235/447, 385, 475, 483, 235/462; 206/328; 377/6, 8, 12

[56] References Cited

U.S. PATENT DOCUMENTS

| | | | |
|---|---|---|---|
| 4,329,571 | 5/1982 | Gerig | 377/8 |
| 4,468,795 | 8/1984 | Gerig | 377/6 |
| 4,484,066 | 11/1984 | DeBlieux et al. | 377/6 |
| 4,947,029 | 8/1990 | Kurihara et al. | 235/475 |

FOREIGN PATENT DOCUMENTS

| | | | |
|---|---|---|---|
| 3522876 | 1/1987 | Fed. Rep. of Germany | 206/328 |

*Primary Examiner*—David Trafton
*Assistant Examiner*—Edward H. Sikorski
*Attorney, Agent, or Firm*—Lee Patch; Daniel H. Kane

[57] ABSTRACT

A machine provides automated counting of integrated circuit (IC) parts packed in a shipping tube which may be, for example, an opaque shipping rail for translation of the rail along the track. An elongate support or track receives and holds a shipping rail. A first rail sensor positioned adjacent to the track senses the presence of a rail on the support track and generates a start count signal. A second rail sensor positioned along the track generates a stop count signal after the scanning of the rail by the sensors is completed. An IC parts sensor provided by an inductive proximity sensor is positioned adjacent to the track between the first and second rail sensors and senses the presence of IC parts contained in the shipping rail. A roller drive translates the shipping rail and the sensors relative to each other for scanning of the rail by the sensors. The parts sensor generates parts counting signals from the start count signal to the stop count signal. A computer processor processes the parts counting signals, calculates the number of IC parts in a rail, and accumulates and displays the count of rails and parts.

20 Claims, 9 Drawing Sheets

FIG. 1
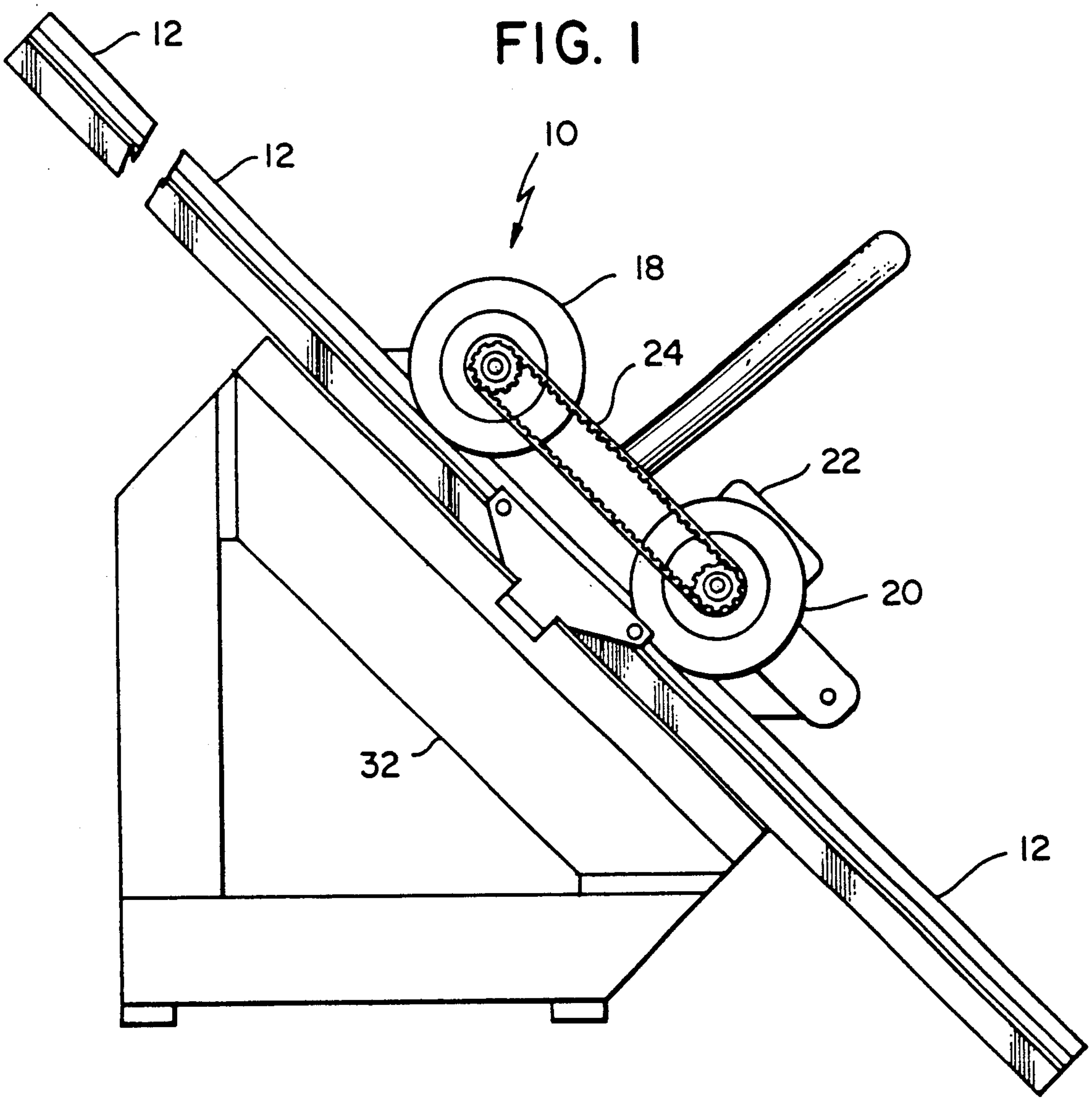
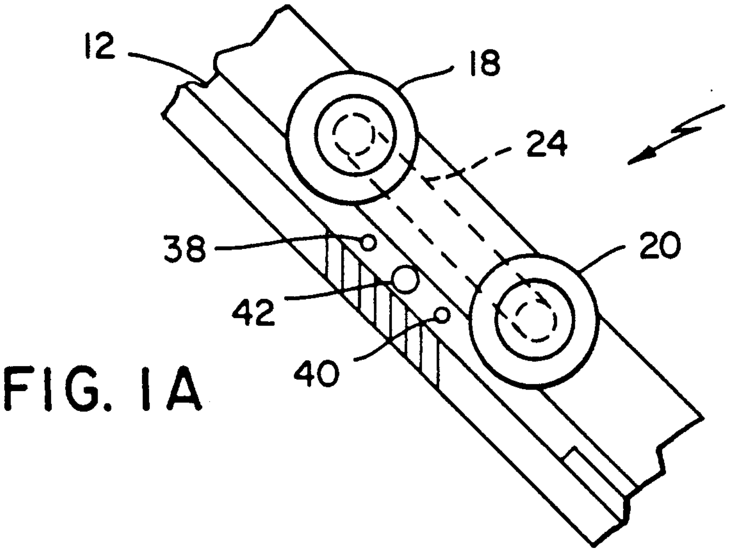
FIG. 1A (SHEET 1)

(SHEET 2)

(SHEET 1)

(SHEET 2)

MACHINE FOR COUNTING IC PARTS IN A SHIPPING RAIL

TECHNICAL FIELD

This invention relates to a machine for counting metal parts stacked or aligned in a shipping tube. In particular the invention provides a machine for counting integrated circuit (IC) parts packed in an opaque shipping rail to assure shipment of the required number of parts in an order.

BACKGROUND ART

In order to avoid a high incidence of incorrect shipment quantities, it may be necessary to resort to a manual parts count in filling each order of IC parts and devices. Manual counting is accomplished by examining IC parts packed within the rail. Visual access through a low visibility window along the top of the rail is difficult and the manual counting process is slow, tedious, and itself subject to error. To applicant's knowledge there does not exist a machine for automated counting of IC parts in an IC parts shipping tube or rail.

OBJECTS OF THE INVENTION

It is therefore an object of the present invention to provide an automated machine for accurate counting of IC parts and devices packed in an opaque shipping tube or rail.

Another object of the invention is to provide a computer processor controlled automated counting system for counting IC parts in a shipping rail. The invention also provides cumulative counting information for rails and parts in a lot, display indication for operator control, and alarm and reset features for results falling outside of acceptable limits.

A further object of the invention is to provide a machine for counting selected metal parts stacked or aligned in adjacent proximity from counting signal data and selected parts parameter data. The automated machine is also capable of detecting and compensating for incidental variations in the operation of the system.

DISCLOSURE OF THE INVENTION

In order to accomplish these results the invention provides a machine, for counting parts in an elongate shipping tube commonly known as a "rail". The word "rail" is therefore used in the specification and claims according to its common meaning in the field of IC packaging to refer to this shipping tube rail. A support receives and holds the rail, a rail sensor senses the presence of a rail on the support, and a parts sensor senses the presence of parts in the rail. A drive translates the rail and sensors relative to each other for scanning the rail by the sensors. Logic control circuitry is coupled to the sensors for calculating the number of parts in the rail.

The apparatus includes an elongate support for receiving and holding the rail. At least one rail sensor is positioned adjacent to the support and is constructed and arranged for sensing the presence of a rail on the support and for generating a rail signal such as a start count signal. A parts sensor is also positioned adjacent to the support and is constructed and arranged for sensing the presence of parts contained in the rail and for generating parts counting signals. A translating drive translates the rail and the sensors relative to each other for scanning the rail by sensors. The word "translate" is used in the specification and claims according to its common mechanical meaning of imparting motion or translation of one object relative to another. A rail sensor also generates another rail signal such as a stop count signal after scanning of the rail by the sensors is completed. Logic control circuitry is operatively coupled to the rail sensors and parts sensor for processing the parts counting signals and calculating the number of parts in the rail.

The machine is adapted for counting metal parts and in particular integrated circuit parts contained in an opaque shipping rail. To this end the IC parts sensor is an inductive proximity sensor positioned adjacent to the support for sensing the presence of the metal lead frames of the IC parts. The inductive proximity sensor includes an input oscillator for generating input counting signals, and an output for delivering output counting signals having a first amplitude in the presence of metal parts contained in the rail and a second amplitude in the absence of metal parts. The counting signals having the first amplitude provide the parts counting signals.

In the preferred example the logic control means includes a computer processor operatively coupled to the rail sensors and IC parts sensor for processing the rail signals and parts counting signals. The processor includes a data memory for storing selected parts parameter data for IC parts being counted. A program memory and counting program provide program steps directing operation of the computer processor for accumulating parts counting signals to provide parts counting signal data. The parts counting program calculates the number of IC parts in a rail from the parts counting signal data and parts parameter data.

According to another feature of the invention the data memory stores selected parts parameter data for a plurality of different types of parts to be counted. An operator data entry input is provided for selecting one of the plurality of types of parts to be counted. The program steps for directing operation of the computer processor includes steps for counting the parts counting signals having a first amplitude between the start and stop count signals thereby generating the parts counting signal data. The program steps direct calculating the number of parts in the rail using the parts counting signal data and the selected parts parameter data for the selected type of parts being counted.

The data memory may also provide selected rail parameter data for the shipping rails. The program steps also direct operation of the computer processor for counting all the counting signals of first and second amplitude between the start and stop count signals thereby generating rail present counting signal data. According to the program steps, any variation in the time of relative translation of the shipping rail and sensors may be calculated using the selected rail parameter data from data memory and the rail present counting signal data. The count of the number of parts can therefore be adjusted to accord with any incidental variations in the relative translation.

According to the example embodiment, the support is an elongate track for receiving and guiding a shipping rail and for translation of the rail along the track. A drive such as an elastic or flexible roller drive engages a rail received on the track and translates the rail along the track at a selected controlled speed. According to this example the rail and parts sensors are positioned adjacent to the track in stationary positions or locations along the track. In the preferred example first and second rail sensors are positioned at first and second spaced apart locations along the track. The parts sensor, for example an inductive proximity sensor, is positioned adjacent to the track between the first and second rail sensors. The first rail sensor upstream with reference to the direction of translation of the rail detects the presence of a rail at the first location and generates the start count signal. The second rail sensor downstream from the first rail sensor in the direction of translation of the rail, senses that the rail has translated past the second location and generates a stop count signal. By way of example the first and second rail sensors may be provided by photosensors.

The logic control circuitry and computer processor are arranged and programmed for counting and accumulating the number of shipping rails containing parts counted by the machine and for accumulating the total count of the number of parts for a plurality of shipping rails. A display is provided for operator use and displays the selected type of parts being counted. The number of parts in the current shipping rail, the cumulative number of rails having parts counted by the machine, and the cumulative number of parts counted for all the cumulative rails is also displayed. An alarm output is provided coupled to the computer processor for actuating the alarm output if the calculated number of parts in a rail falls outside of specified limits. Corrective action can be taken by the operator followed by reset of the current rail data display.

According to an alternative embodiment, the shipping tubes or rails may be formed with bar codes encoding selected parts parameter data for the parts contained in the shipping rail. The logic control circuitry of the parts counting machine includes a bar code reader positioned adjacent to the support or track. The bar code reader enters the selected parts parameter data for the shipping rail to the computer processor and data memory.

Overall the parts counting machine of the invention provides a relatively high speed, automated, accurate parts count of metal parts packed in an opaque shipping tube. It assures correct shipment quantities and overcomes the limitations of manual parts counting. Other objects, features and advantages of the invention are apparent in the following specification and accompanying drawings.

BRIEF DESCRIPTION OF THE DRAWINGS

FIG. 1 is a side elevation view of the shipping rail and IC parts counting apparatus according to the invention.

FIG. 1A is a detailed fragmentary diagrammatic side view showing the positioning of the rail sensors and intermediate parts sensor relative to the flexible drive rollers along the track of the shipping rail and IC parts counting machine.

DESCRIPTION OF PREFERRED EXAMPLE EMBODIMENTS AND BEST MODE OF THE INVENTION

Figure 3:
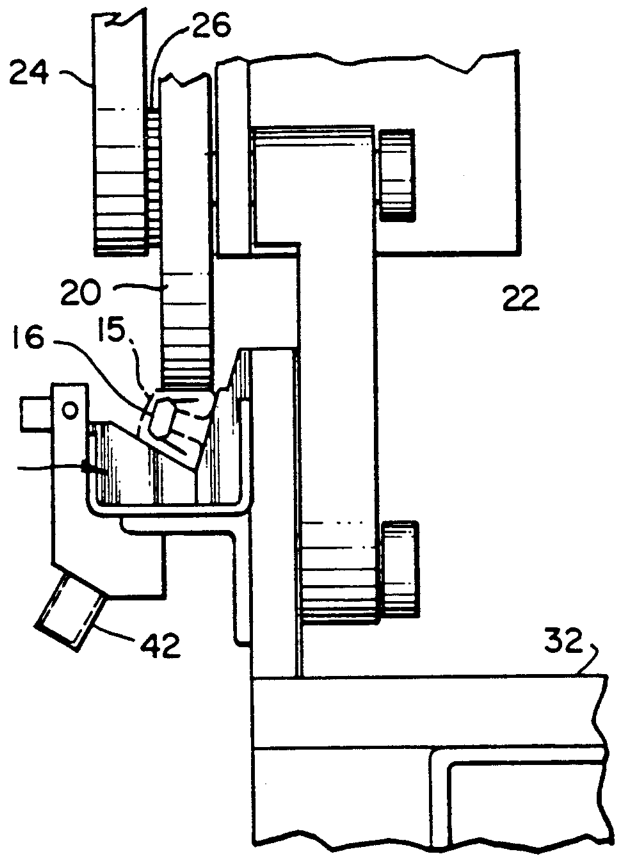
FIG. 3 is a detailed fragmentary end view looking in the direction along the track with a shipping rail shown in phantom outline on the track engaged by a flexible roller.

The apparatus for handling a shipping rail in order to count integrated circuit parts packed in the shipping rail is illustrated in FIGS. 1-4. The shipping rail handling apparatus 10 includes an elongate support track 12 formed with an appropriate track angle 14 for receiving and accommodating an elongate shipping tube or rail 15. In this example the track angle 14 is an acute angle complementary with the acute angle corner configuration of the shipping rail 15. The shape of the shipping rail 15 permits stacking and close packing of IC parts 16 in end to end sequence through the length of the shipping rail.

The support track and feed track 12 is mounted at an angle of, for example 45°, with respect to the horizontal for gravity feed of a shipping rail 15 placed in the track 12 to a pair of controlled drive rollers 18 and 20. Rollers 18 and 20 are flexible foam rollers of low durometer hardness with "sticky" rubber surface for engaging a rail placed on the track 12 and fed by gravity to the first engaging roller 18.

Figure 2:
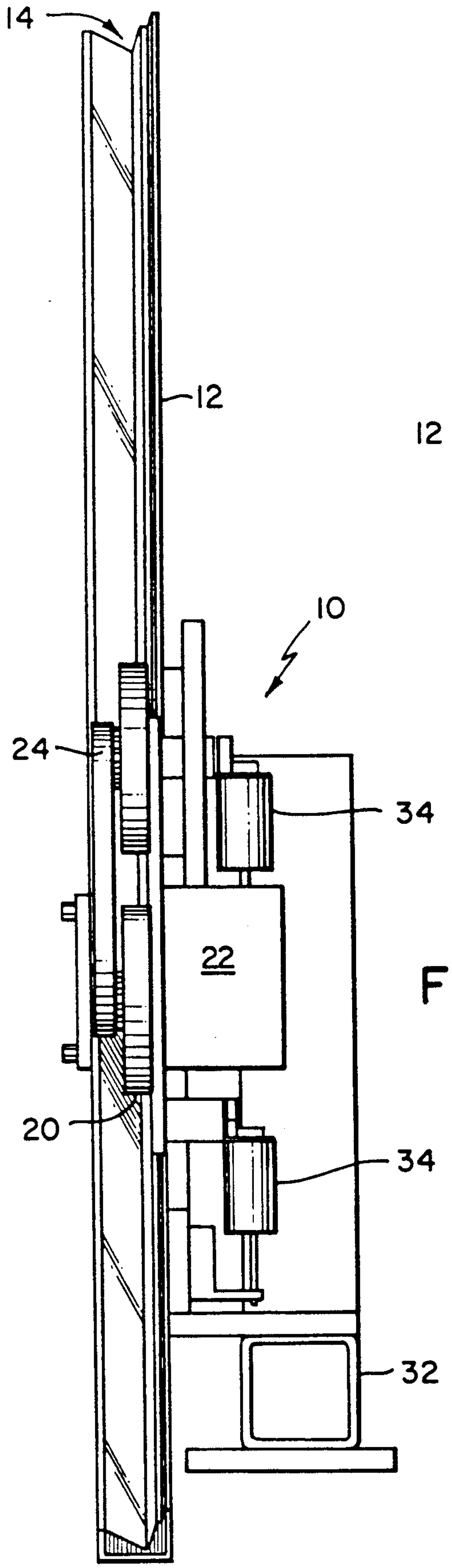
FIG. 2 is a fragmentary plan view or overhead view of the shipping rail and IC parts counting apparatus looking down on the guide track.
Figure 2A:
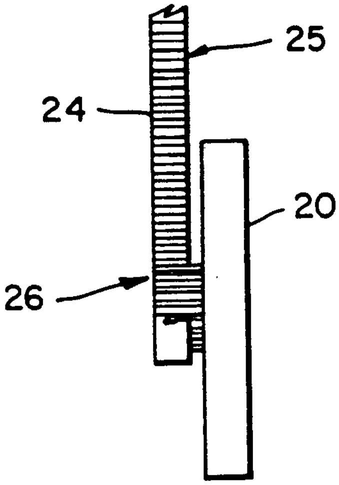
FIG. 2A is a detailed fragmentary cutaway view of a drive roller and drive belt showing the teeth of the timing belt and timing belt drive gear.

As shown particularly in FIGS. 2, 2A and 3 the rollers 18 and 20 are driven by a syncronous motor 22 which directly drives the second feed roller 20. The first and second feed rollers 18 and 20 are coupled together by a timing drive belt 24 having teeth 25 that engage the complementary teeth on roller drive gears 26.

Figure 4:
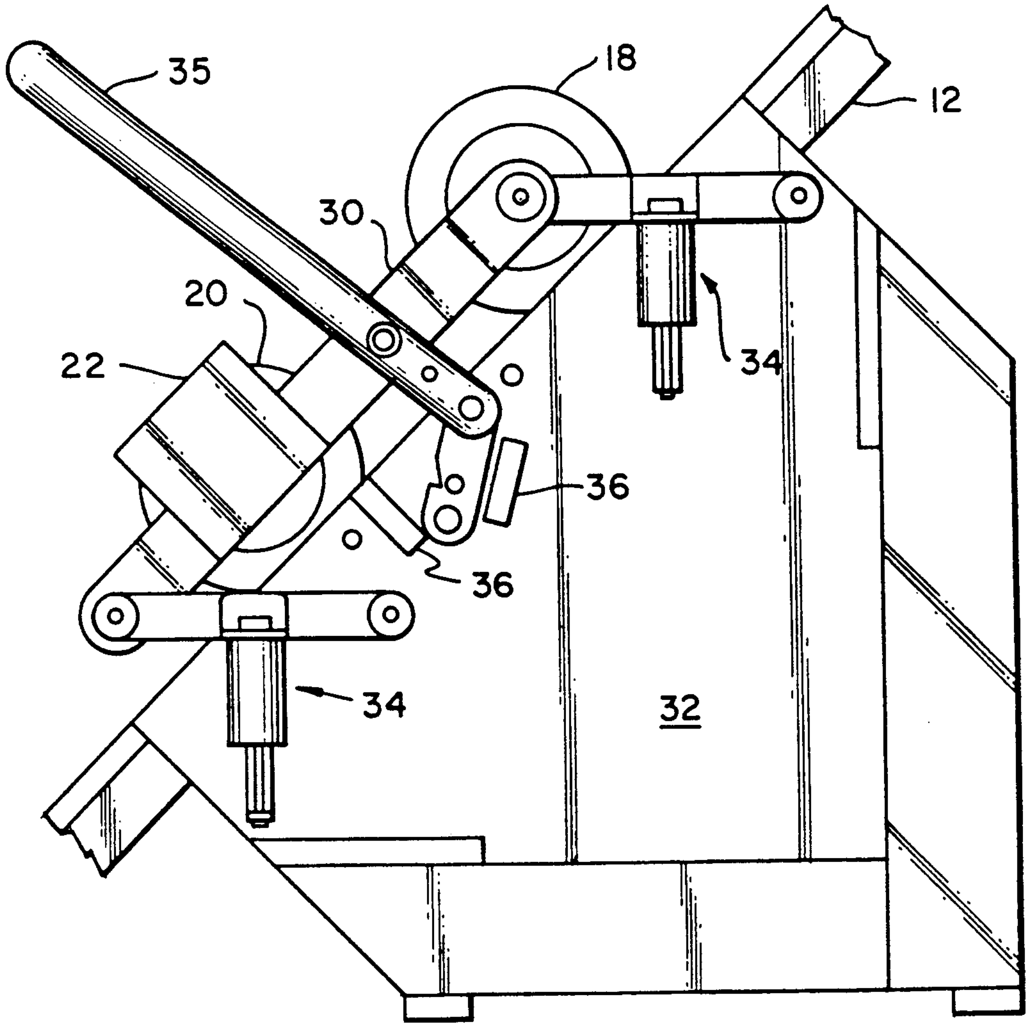
FIG. 4 is a side elevation view of the shipping rail and IC parts counting apparatus from the side opposite FIG. 1 showing the lever arm and stops for selective spacing of the drive rollers relative to the track.

As shown in FIG. 4 the rollers 18 and 20 are mounted on a cradle 30 which is in turn pivotly mounted to the base 32 on shock absorbing airpot brackets 34. The cradle 30 may be raised and lowered by a lever arm 35 for adjusting the spacing of the rollers 18 and 20 from track 12 by raising and lowering the cradle. Adjustable stops 36 can be set to provide the desired spacing so that the foam rollers frictionally engage a shipping rail with adequate pressure as illustrated in FIG. 3.

The syncronous motor 22 and timing drive belt 24 between the rollers provide controlled drive of the foam drive rollers 18 and 20. The foam drive rollers 18 and 20 in turn provide controlled feed of a shipping rail engaged by the rollers at constant speed along the track 12. The constant speed setting of the apparatus provides the basis for part of the stored data for the logic control and computer processing section hereafter described. In particular it establishes the number of rail present counting or timing signals to be expected for a shipping rail of standard length.

The positioning of first and second rail sensors and a parts sensor relative to the drive rollers 18 and 20 is illustrated in FIG. 1A. The first and second rail sensors 38 and 40 are positioned adjacent to the track 12 spaced apart between the drive rollers 18 and 20. The rail present sensors 38 and 40 are photosensors responsive to the cutoff of a light source by the opaque shipping rail. The parts sensor 42 is positioned adjacent to the track 12 between the photosensor rail sensors 38 and 40. The parts sensor is provided by an inductive proximity sensor. The inductive proximity sensor pickup or coil is seated in a well formed in the metal mounting and side of the track 12 so that it is preferably within 10 mils of the track surface and the surface of a rail translating along the track. The projecting end of the inductive proximity sensor 42 is visible in FIG. 3 and the sensor is shown diagrammatically in further detail in FIG. 3A.

Figure 3A:
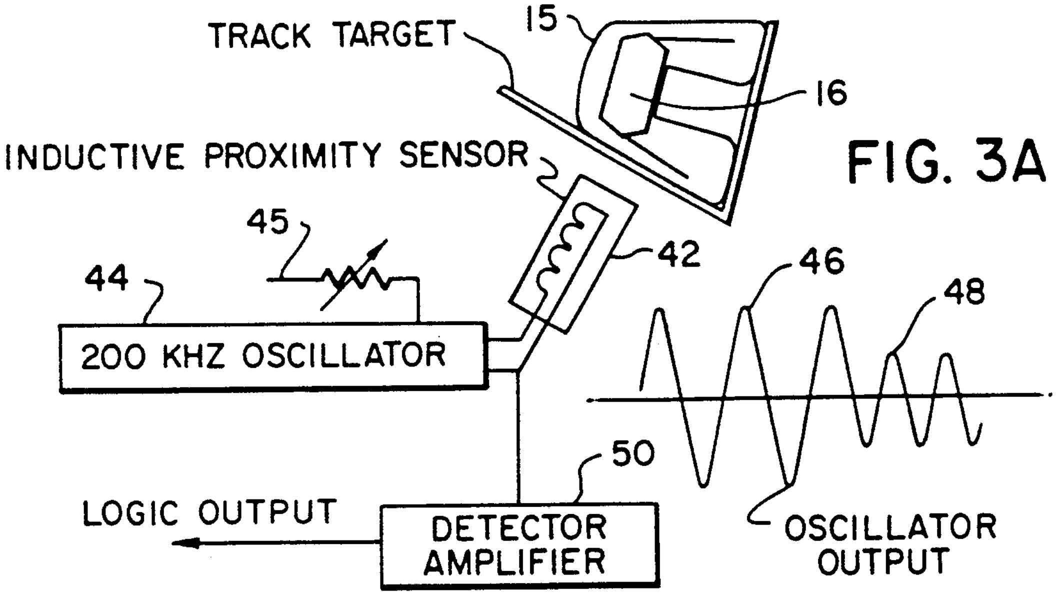
FIG. 3A is a schematic block diagram and diagrammatic view showing the placement of the inductive proximity parts sensor adjacent to the track.

Referring to FIG. 3A the inductive proximity sensor pickup or coil 42 is seated in a well adjacent to the surface of track 12 and the shipping rail 15 which contains IC parts such as DIP's 16. An oscillator 44 is coupled to the sensor 42 providing an input timing or counting signal of for example 200 KHz or other selected frequency. The output of the oscillator 44 and inductive proximity sensor 42 are timing or counting signals at the selected frequency of for example 200 KHz having a first amplitude 46 in the absence of metal parts contained in the shipping rail 15 and a second amplitude 48 in the presence of metal parts. Amplitude is adjusted by potentiometer 45. The metal lead frames of the dual-in-line IC packages 16 provide the metal parts which determine the oscillator output amplitudes 46 and 48. The oscillator output is amplified by detector amplifier 50 for input to the logic circuitry interface board and processing by the computer processor as hereafter described.

An electro-inductive proximity sensor for use in the present invention can be obtained from Electro Corporation of Sarasota, Fla. The Mini Prox II Model PBW101 (TM) provides a satisfactory inductive sensor pickup or coil and accompanying oscillator. It is best to add an additional amplifier circuit to provide greater sensitivity and amplification of the detected oscillator output timing or counting signals.

Figure 5:
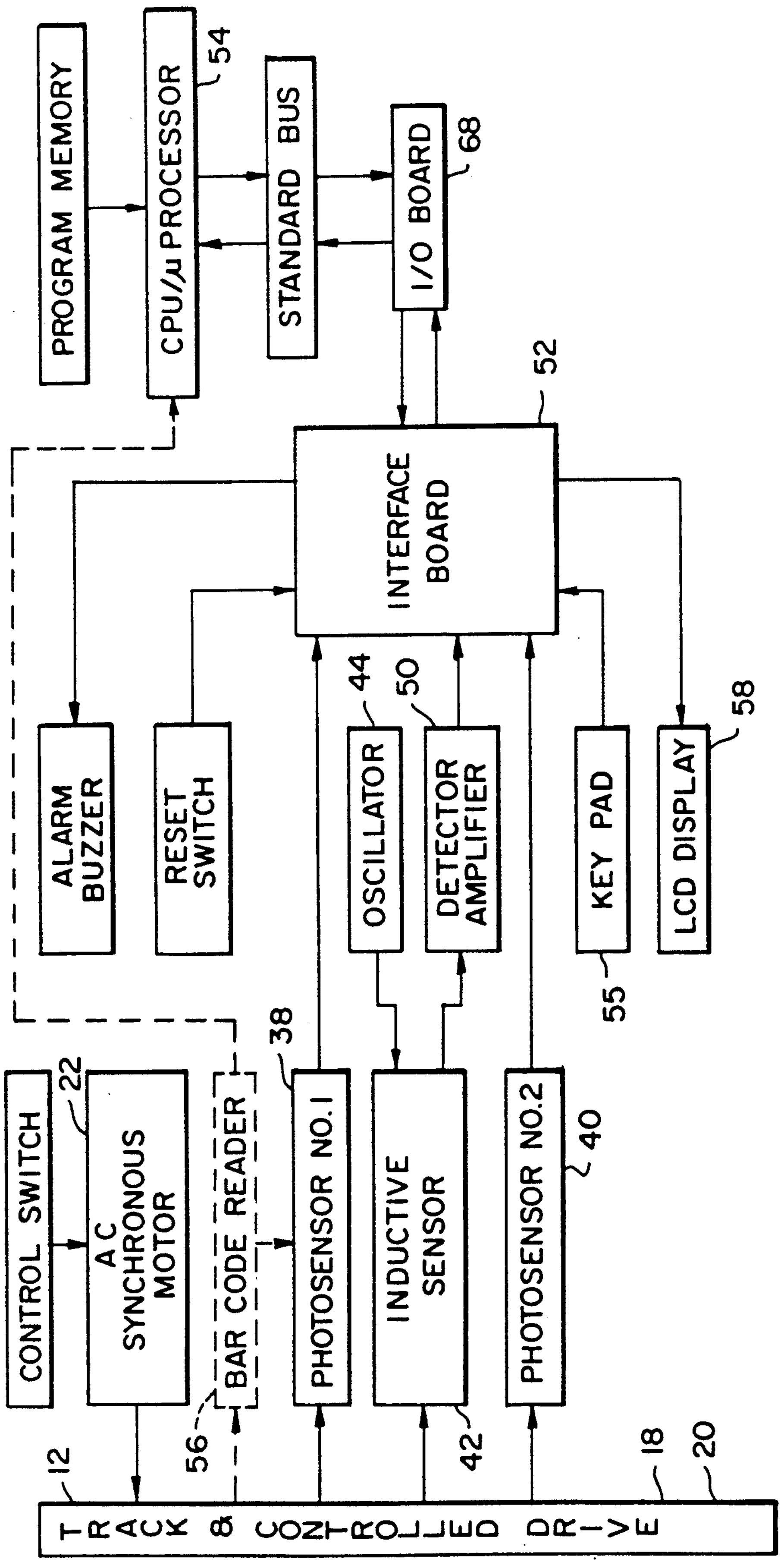
FIG. 5 is a system block diagram of the shipping rail and IC parts counting machine according to the invention.

A system block diagram of the apparatus for handling a shipping rail and accompanying logic control and computer processing elements is illustrated in FIG. 5. Components already described with reference to FIGS. 1-4 are indicated by the same reference numeral. The details of the logic interface board 52 are set forth in more detail in sheets 1 and 2 of FIG. 6 hereafter described. The logical program steps of the system operating program stored in the program memory of microprocessor 54 are set forth in further detail in the flow chart of sheets 1 and 2 of FIG. 7. The microprocessor is, for example, a Z80 CPU Board. The further operation of the shipping rail handling apparatus, logic control elements and system operation program steps of the system block diagram of FIG. 5 and flow chart of FIG. 7 are as follows.

The system operator enters at key pad 55 parts parameter data for the DIP or other IC packages to be counted, for example the number of leads or length of the package to be counted and the material of the package such as plastic or ceramic. This parts parameter data may alternatively be entered automatically using a bar code reader 56 for shipping rails prepared with bar coded parts parameter data on the outside of the opaque shipping rail. This information entered at keypad 55 by the operator is also displayed on a system display such as LCD display 58 shown in more detail in the examples 1 and 2 of FIGS. 8 and 8A. The operator places the shipping rail in track 12 so that it is fed by gravity to the first controlled drive roller 18. The foam drive roller 18 engages the shipping rail so that it begins a controlled translation at constant speed past the sensors. The standard shipping tubes or rails typically have a length of for example 19″ and the controlled feed velocity is set for a transit time of the shipping rail past the scanning sensors of for example 1.25 seconds.

The microprocessor 54 through interface board 52 checks the output of the photosensors each time interval of for example ½ millisecond to determine the presence of a rail. When the rail occludes the first photosensor a start count signal is initiated for counting the clock counting signals from the oscillator output. All of the clock counting signals are counted for the rail present clock signal counting data providing a measure of the transit time of the shipping rail. As soon as the inductive sensor senses the presence of metal parts, the microprocessor begins counting the lower amplitude clock counting signals from the output of the oscillator and inductive proximity sensor to provide the parts present clock signal counting data. When the shipping rail passes the second photosensor 40 so that it is no longer occluded the stop count signal is actuated terminating the accumulation of rail present clock signal count data and parts present clock signal count data.

The program steps of the computer processor then direct the calculation of the number of parts using the parts present clock signal count data for example divided by the starting parts parameter data for the selected IC parts being counted. The rail present clock signal count data is also checked to be sure that the shipping rail was of standard length and passed by the scanning sensors at the standard scanning speed. Compensation can be provided for any variation in the scanning speed by proportionally adjusting the parts present clock signal count data. If any of the rail or parts counting data falls outside of acceptable limits an alarm is actuated to disable the system and data is not accumulated. A non-conforming shipping rail can then be removed and the system reset to renew counting operations.

Program steps provide for accumulation of rail count data and parts count data for an entire lot. The cumulative results are displayed on the LCD display as illustrated in the examples 1 and 2 of FIGS. 8 and 8A. This display shows the count data for the current rail and the cumulative count data as well. Correct shipment quantity for a lot order can therefore be assured.

According to one example the timing signals or count signals are generated by the oscillator at the rate of 200,000 per second. In the presence of metal parts the count signals are distinguishable at the second amplitude or lower amplitude. For the parts present counting signal data the count signals are counted throughout the total length of sensed lead frame metal through the packed IC parts from one end of the shipping rail to the other. The parts parameter data provides the number of counting signals for the lead frame length of each of the selected IC parts being counted. From this data the total number of parts is then calculated. Other timing signal or counting signal frequencies may of course be selected with the parts parameter data appropriately adjusted to coincide with the selected frequency or cycle time of the oscillator counting signals.

Figure 6:
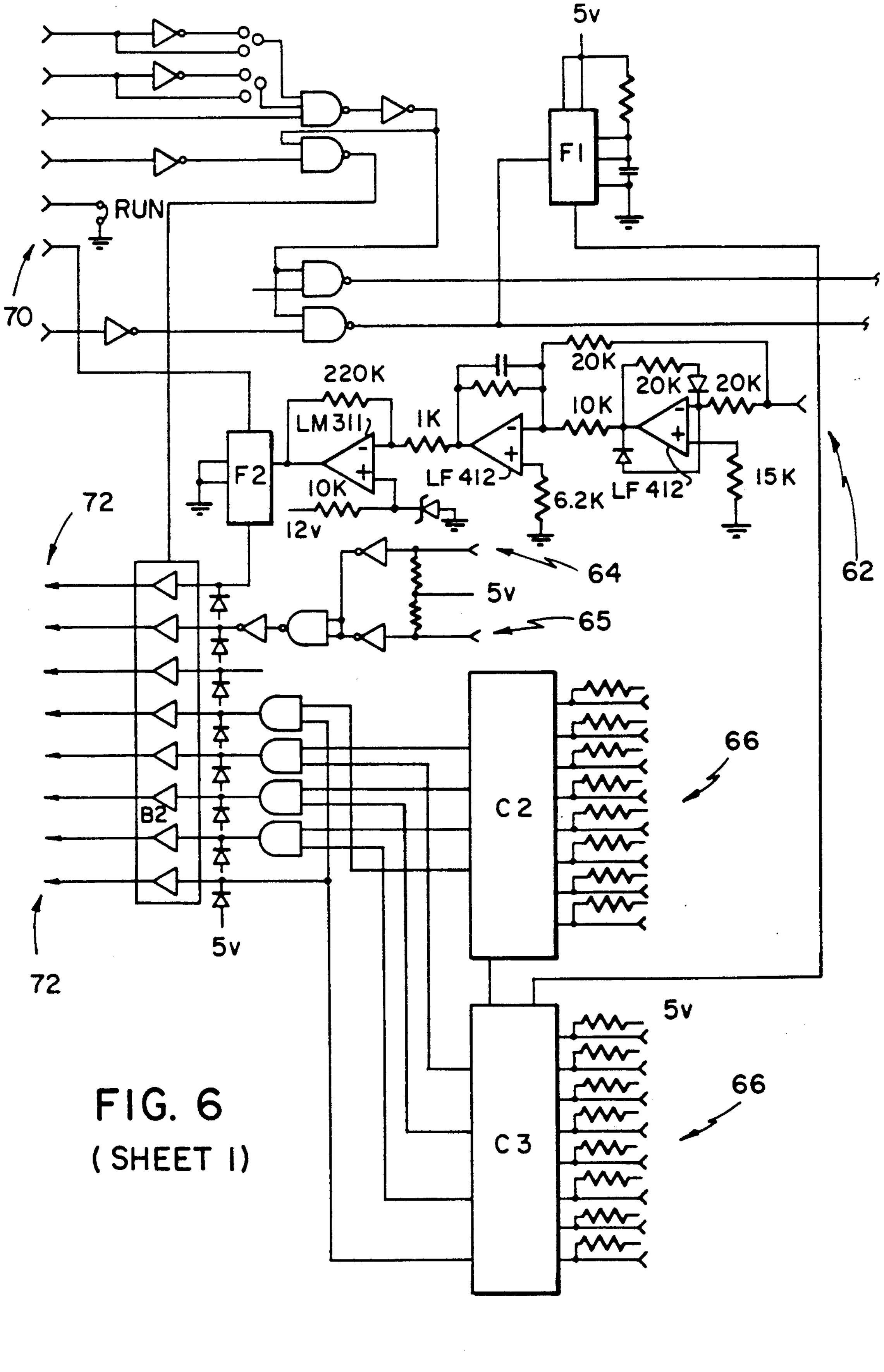
FIG. 6 sets forth on two sheets a detailed schematic circuit diagram of the interface board of the system block diagram of FIG. 5.
Figure 6:
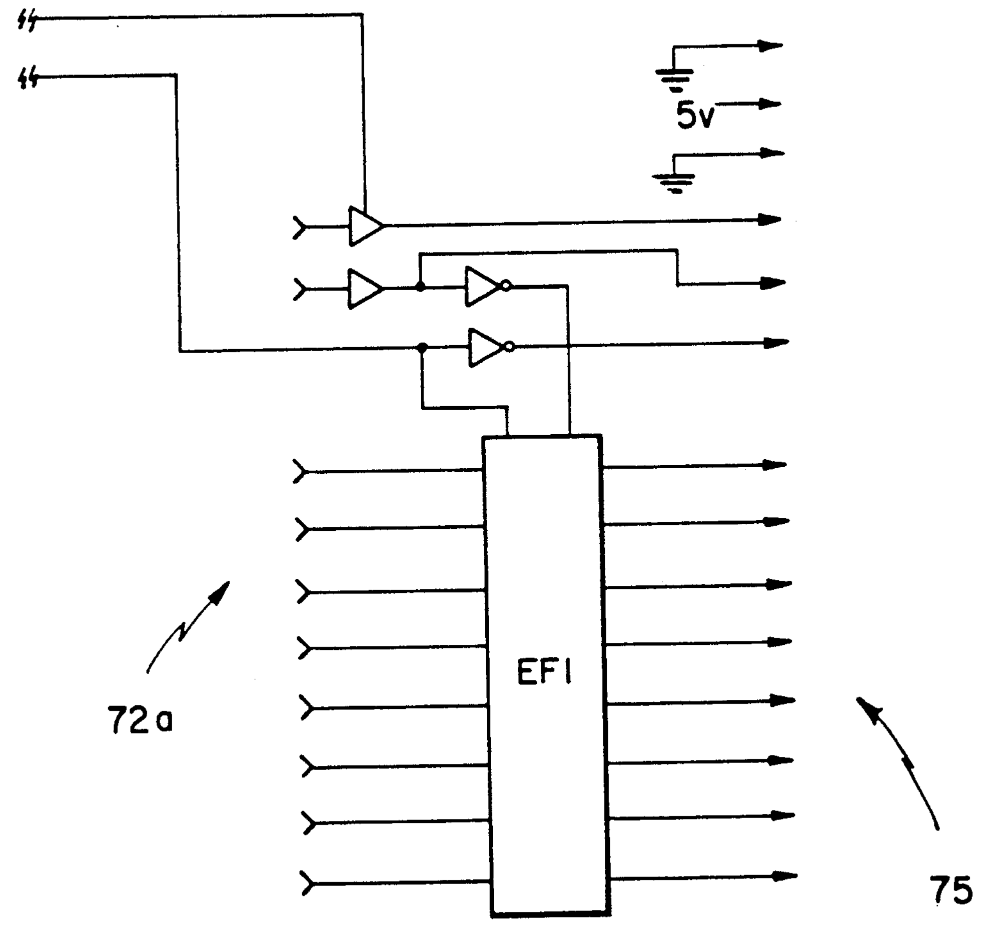
Figure 7:
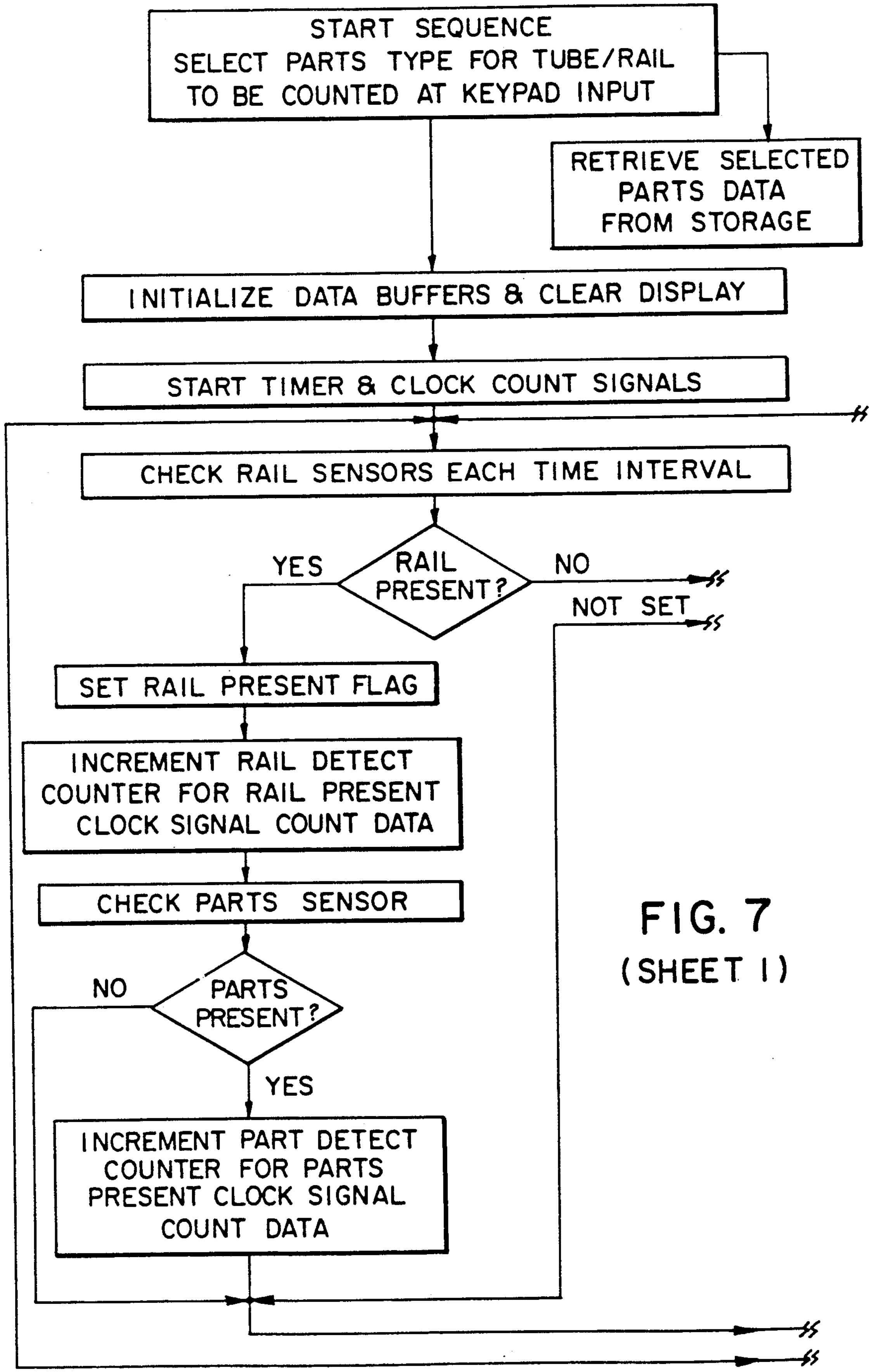
FIG. 7 sets forth on two sheets a flow chart of the parts counting program and program sequence steps for directing operation of the computer processor in accordance with the invention.
Figure 7:
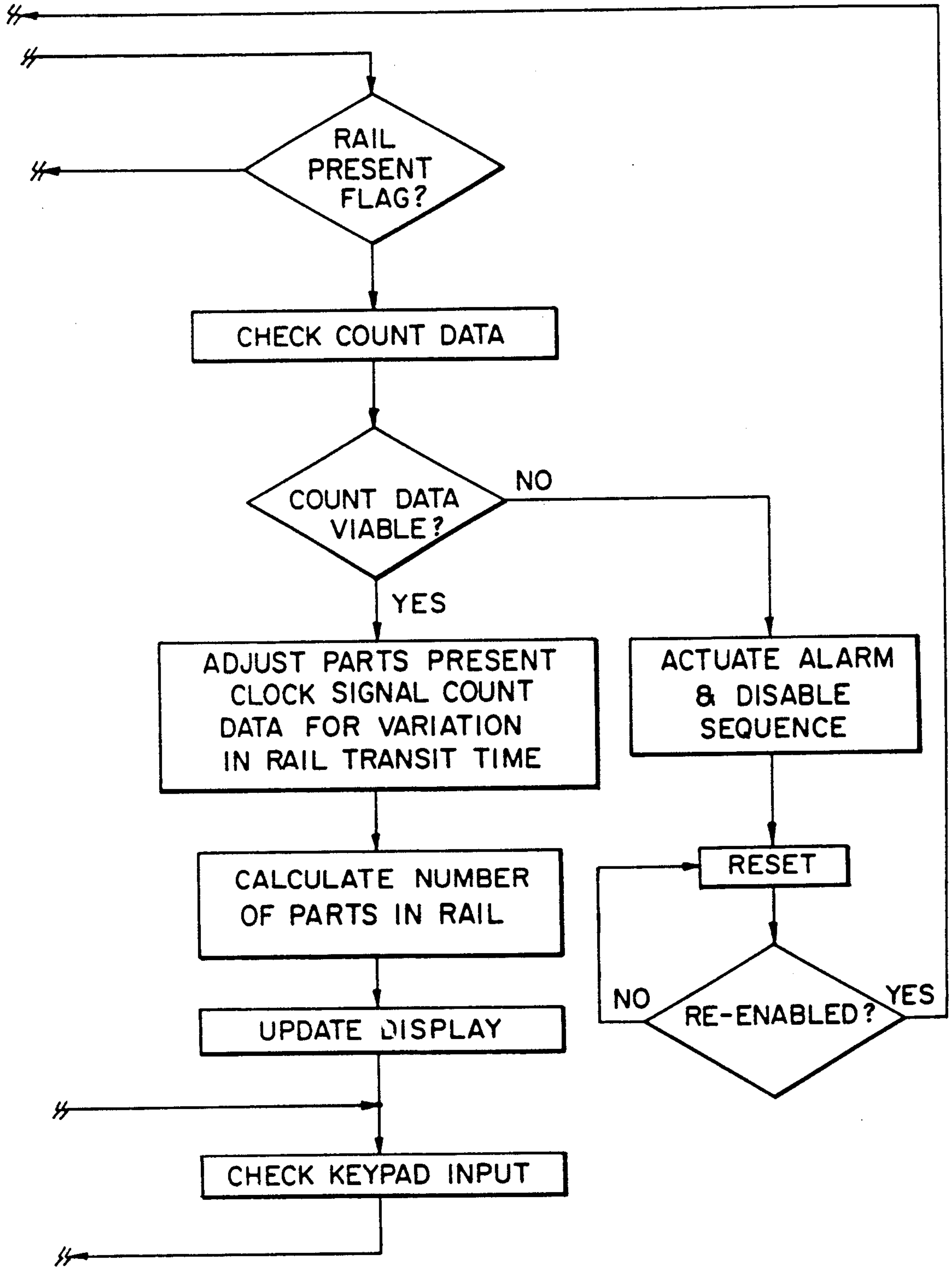

A detailed schematic circuit diagram suitable for the interface board 52 is illustrated in sheets 1 and 2 of FIG. 6. The interface board circuit diagram is presented with standard logic symbols and generic IC parts hereafter identified. Signals from the inductive proximity sensor 42 and detector amplifier 50 are coupled to the input 62 and amplified by standard op amps LF412. The output from the amplifier is applied to one input of a comparator LM311. The second input to LM311 is a fixed reference voltage provided by a Zener diode. The output of the comparator is a logic zero in the presence of the metal lead frames and a logic one in the absence of the lead frames. Signals from photosensors 38 and 40 are coupled to the photosensor inputs 64 and 65 respectfully. Data entry signals from the operator key pad 55 are coupled to the inputs 66 of blocks C2 and C3 provided by a generic designation 74LS148 DIP part. Signals from the I/O board 68 of FIG. 5 are coupled to the inputs 70 while signals to the I/O board are provided from outputs 72 from block B2, a generic designation 74 LS244 DIP part. Control signals to the LCD display 58 from the interface board 52 are provided at the outputs 75 from block EFI, a generic designation 74LS245 DIP part. The inputs 72A to block EFI are also provided by the outputs 72 from block B2. The I/O Board is, for example, a Prolog I/O standard board.

Figure 8:
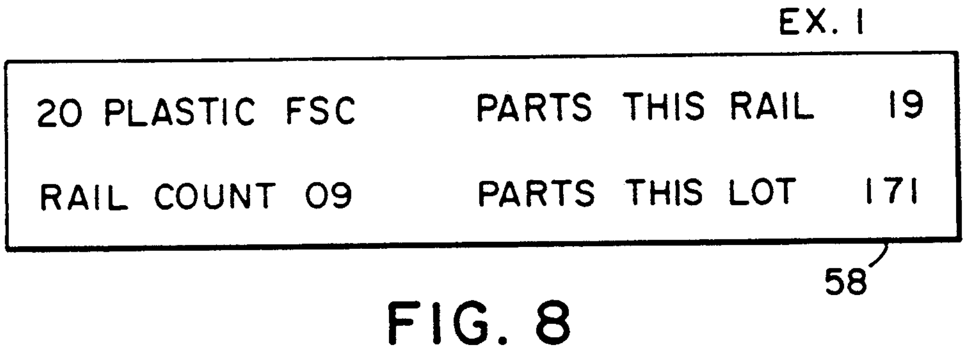
FIGS. 8 and 8A are plan views of the operator display coupled to the interface board of the system block diagram of FIG. 5 showing two display examples.
Figure 8A:
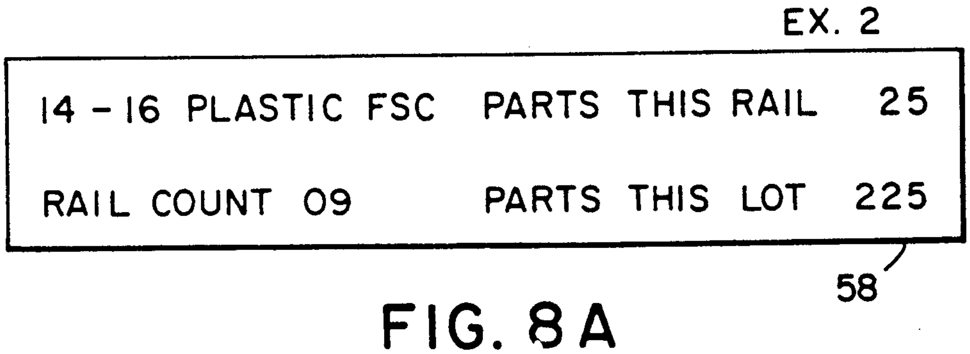

Example displays for two examples, Example 1 and Example 2 on the LCD display 58 are illustrated in FIGS. 8 and 8A. In the example of FIG. 8 20 pin plastic DIP parts are being counted. There are 19 parts in the current rail, and 9 rails have been counted with a cumulative part count of 171 IC parts. In the example of FIG. 8A, 14 to 16 pin plastic DIP parts are being counted with 25 parts counted in the current rail. Nine rails have been counted for a cumulative total of 225 parts.

In the apparatus example of FIGS. 1-4 a stationary track with stationary sensors along the track are mounted on a base and the shipping tube or rail translates along the track. Scanning of the shipping rail and rail contents by the sensors is accomplished by translation of the rail past the sensors. According to an alternative embodiment of the invention, the shipping rail is mounted on a stationary support and the sensors are mounted on a translating carriage. The shipping rail is mounted, for example, in a vertical orientation. Scanning of the shipping rail and its contents by the sensors is accomplished by motion of the sensors translating from one end of the shipping rail to the other.

While the invention has been described with reference to particular example embodiments it is intended to cover all modifications and equivalents within the scope of the following claims.

We claim:

1. A machine for counting parts contained in elongate shipping tubes or rails comprising:

a support for receiving and holding a rail;

sensor means comprising rail sensor means for sensing the presence of a rail on the support and parts sensor means for sensing the presence of parts contained in the rail;

drive means for translating the rail and the sensor means relative to each other at substantially constant speed for scanning the rail by the sensor means;

and logic control means operatively coupled to the rail sensor means for generating rail data for determining variation in rail length or rail speed and for counting the number of rails, said logic control means also being coupled to the parts sensor means for generating parts data for calculating the number of parts in a rail.

2. A machine for counting integrated circuit (IC) parts contained in a shipping tube or rail, said IC parts being formed with metal lead frames, comprising:

a support for receiving and holding a shipping rail;

sensor means comprising rail sensor means positioned adjacent to the support and constructed for sensing the presence of a rail on the support and for generating rail signals including a start count signal and a stop count signal, said sensor means also comprising IC parts sensor means having an inductive proximity sensor positioned adjacent to the support and constructed for sensing the presence of IC parts contained in a rail on the support and for generating parts counting signals;

drive means for translating the rail and the sensor means relative to each other for scanning the rail by the sensor means;

and computer processor means operatively coupled to the rail sensor means and IC parts sensor means for processing said rail signals and parts counting signals, said processor means comprising memory means storing selected parts parameter data for IC parts being counted, and program means including program steps directing operation of the computer processor for accumulating parts counting signals to provide parts counting signal data and calculating the number of IC parts in a rail from the parts counting signal data and parts parameter data.

3. The machine of claim 2 wherein the inductive proximity sensor comprises an input oscillator for generating counting signals, and an output for delivering counting signals having a first amplitudes in the absence of metal parts contained in a rail and a second amplitude in the presence of metal parts, the counting signals having said second amplitude comprising the parts counting signals.

4. The machine of claim 3 wherein the memory means stores selected parts parameter data for a plurality of types of parts to be counted and comprising operator data input means for selecting one of the plurality of types of parts to be counted, and wherein the program steps for directing operation of the computer processor include steps for counting the parts counting signals having a second amplitude thereby generating the parts counting signal data, and calculating the number of parts in the rail using the parts counting signal data and the selected parts parameter data for the selected type of parts being counted.

5. The machine of claim 4 wherein the memory means comprises selected rail parameter data for the shipping rails and wherein the program means comprises further program steps directing operation of the computer processor for counting the counting signals of first and second amplitude between the start count signal and stop count signal thereby generating rail present counting signal data, calculating any variation in the time of relative translation of the shipping rail and sensor means using the selected rail parameter data and said rail present counting signal data, and adjusting the count of the number of parts in proportion to said variation.

6. A machine for counting parts contained in an elongated shipping tube or rail comprising:

an elongate track for receiving and guiding a shipping rail and for translation of the rail along the track;

drive means for engaging a rail received on the track and for translation of the rail along the track at a selected speed;

rail sensor means positioned adjacent to the track and constructed for sensing the presence of a rail at a location along the track during translation of a rail and for generating a start count signal;

parts sensor means positioned adjacent to the track and constructed for sensing the presence of parts contained in a rail during translation of the rail and for generating parts counting signals;

said rail sensor means also being constructed to generate a stop count signal after translation of the rail past a location along the track;

and logic control means operatively coupled to the rail sensor means and parts sensor means for processing said start count, stop count, and parts counting signals for calculating the number of parts in the rail.

7. The machine of claim 6 wherein the rail sensor means comprises first and second rail sensors at first and second spaced apart locations along the track, wherein the parts sensor means comprises a parts sensor adjacent to the track between the first and second rail sensors, wherein the first rail sensor is positioned for detecting the presence of a rail at the first location and for generating a start count signal, and wherein the second rail sensor is positioned for sensing that the rail has translated past the second location and for generating a stop count signal.

8. The machine of claim 7 wherein the first and second rail sensors comprise photosensors for detecting the presence and absence of a rail at said first and second locations along the track.

9. The machine of claim 7 wherein the parts sensor comprises an inductive proximity sensor positioned between the first and second rail sensors for sensing the presence of metal parts in a rail.

10. The machine of claim 9 wherein the inductive proximity sensor comprises an input oscillator for generating counting signals, and an output for delivering counting signals having a first amplitude in the absence of metal parts contained in a rail and a second amplitude in the presence of metal parts, the counting signals having said second amplitude comprising the parts counting signals.

11. The machine of claim 10 wherein the logic control means comprises a computer processor, memory means storing selected parts parameter data for a plurality of types of parts to be counted, operator data input means for selecting one of the plurality of types of parts to be counted, and program means comprising program steps for directing operating of the computer processor including steps for counting the counting signals having a second amplitude between the start and stop count signals thereby generating parts counting signal data, and calculating the number of parts in the rail using the parts counting signal data and the selected parts parameter data for the selected type of parts being counted.

12. The machine of claim 11 wherein the memory means comprises selected rail parameter data for the shipping rails and wherein the program means comprises further program steps directing operation of the computer processor for counting all the counting signals of first and second amplitude between the start and stop count signals thereby generating rail present counting signal data, calculating any variation in the time of translation of the shipping rail using the selected rail parameter data and said rail present counting signal data, and adjusting the count of the number of parts in proportion to said variation.

13. The machine of claim 12 wherein the logic control means comprises means for counting and accumulating the number of shipping rails containing parts counted by the machine, and wherein said program means comprises program steps directing operation of the computer processor for accumulating the total count of the number of parts for a plurality of shipping rails having parts counted by the machine.

14. The machine of claim 12 comprising alarm output means coupled to the computer processor, and wherein the program means comprises program steps for actuating the alarm output means if the calculated number of parts in the rail falls outside of specified limits.

15. The machine of claim 13 comprising display means constructed and arranged for displaying the selected type of parts being counted, number of parts in current shipping rail, cumulative number of rails having parts counted by the machine, and cumulative number of parts counted for said cumulative number of rails.

16. The machine of claim 11 wherein the shipping rails having parts to be counted are formed with bar codes encoding selected parts parameter data for parts contained in the shipping rail, and further comprising bar code reader means positioned adjacent to the track and operatively coupled to the computer processor for entering the selected parts parameter data for the shipping rail.

17. The machine of claim 9 wherein the parts to be counted comprise integrated circuit parts formed with metal lead frames to be sensed by the inductive proximity sensor.

18. A machine for counting parts contained in an elongate shipping tube or rail comprising:

an elongate track for receiving and guiding a shipping rail and for translation of the rail along the track;

flexible roller means spaced from the track a selected distance for engaging a rail received on the track, and roller drive means for controlled rotation of the roller to translate the rail along the track at a selected speed;

oscillator means for generating counting signals at a selected frequency;

rail sensor means positioned adjacent to the track and constructed for sensing the presence of a rail at a location along the track during translation of a rail and for generating a start count signal to initiate counting of counting signals during presence of a rail at said location;

parts sensor means positioned adjacent to the track for sensing the presence of parts contained in a rail present on the track and initiating counting of counting signals during presence of parts;

said rail sensor means also being constructed for generating a stop count signal after translation of a rail past a location along the track to stop counting of counting signals;

and a computer processor comprising memory means storing selected parts parameter data for a plurality of types of parts to be counted, operator data input means for selecting one of the plurality of types of parts to be counted, and program means comprising program steps for directing operation of the computer processor including steps for counting of counting signals when the presence of parts contained in a rail is sensed by the parts sensor means and generating parts present counting signal data, and for calculating the number of parts in a rail using the selected parts parameter data for the selected type of parts being counted and the parts present counting signal data.

19. The machine of claim 18 wherein the memory means comprises selected rail parameter data for the shipping rail having parts counted by the machine, and wherein the program means comprises further program steps directing operation of the computer processor for counting of counting signals between the start count signal and stop count signal and generating rail present counting signal data, and for calculating any variation in the time of translation of the shipping rail using the selected rail parameter data and rail present counting signal data, and adjusting the calculated number of parts in the rail in proportion to said variation.

20. The machine of claim 19 wherein the parts sensor comprises an inductive proximity sensor positioned adjacent to the track for sensing the presence of metal parts in a rail, and wherein the inductive proximity sensor comprises the oscillator means for generating counting signals and an output for delivering counting signals having a first amplitude in the absence of metal parts contained in a shipping rail and a second amplitude in the presence of metal parts, and wherein the program means comprises program steps for directing operation of the computer processor including steps for counting the counting signals having a second amplitude between the start and stop count signals thereby generating the parts present counting signal data and steps for counting all the counting signals of first and second amplitude between the start and stop count signals for generating the rail present counting signal data.

* * * * *